US012766565B2

(12) United States Patent
Miyazaki

(10) Patent No.: US 12,766,565 B2
(45) **Date of Patent: *Oct. 20, 2026**

(54) METHOD FOR CLEANING OBJECT SURFACE

(71) Applicant: KAO CORPORATION, Tokyo (JP)

(72) Inventor: Kanae Miyazaki, Tokyo (JP)

(73) Assignee: KAO CORPORATION, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 18/860,212

(22) PCT Filed: Apr. 27, 2023

(86) PCT No.: PCT/JP2023/016633

§ 371 (c)(1),
(2) Date: Oct. 25, 2024

(87) PCT Pub. No.: WO2023/210744

PCT Pub. Date: Nov. 2, 2023

(65) Prior Publication Data

US 2025/0296123 A1 Sep. 25, 2025

(30) Foreign Application Priority Data

Apr. 28, 2022 (JP) ................................ 2022-074082

(51) Int. Cl.
*B08B 3/08* (2006.01)

(52) U.S. Cl.
CPC ..................................... *B08B 3/08* (2013.01)

(58) Field of Classification Search
None
See application file for complete search history.

(56) References Cited

U.S. PATENT DOCUMENTS

| | | | | |
|---|---|---|---|---|
| 2,028,091 | A | 1/1936 | Jaeger | |
| 5,312,561 | A | 5/1994 | Hoshino et al. | |
| 2002/0064854 | A1 | 5/2002 | Takaiwa et al. | |
| 2025/0257289 | A1* | 8/2025 | Miyazaki | C11D 1/831 |

FOREIGN PATENT DOCUMENTS

| | | | | |
|---|---|---|---|---|
| DE | 102014204352 | A1 * | 9/2015 | C11D 1/37 |
| EP | 0071412 | A1 | 2/1983 | |
| JP | S58-24555 | A | 2/1983 | |
| JP | H05-25492 | A | 2/1993 | |
| JP | 2019182911 | A | 10/2019 | |
| JP | 2020100745 | A | 7/2020 | |
| JP | 2020152757 | A | 9/2020 | |
| JP | 2021017508 | A | 2/2021 | |
| WO | WO-9918218 | A1 | 4/1999 | |

OTHER PUBLICATIONS

DE-102014204352 English translation, accessed in Feb. 2026. (Year: 2015).*
International Search Report and Written Opinion issued Jul. 25, 2023 in PCT/JP2023/016633 (with English translation of the Search Report), 10 pages.
English translation of the International Preliminary Report on Patentability and Written Opinion issued Nov. 7, 2024, in PCT/JP2023/016633, 5 pages.

* cited by examiner

*Primary Examiner* — Kaj K Olsen
*Assistant Examiner* — Arlyn I Rivera-Cordero
(74) *Attorney, Agent, or Firm* — Element IP, PLC

(57) ABSTRACT

A method for cleaning an object surface including, bringing a cleaning liquid obtained by diluting a liquid cleaning agent composition with water into contact with the object surface, the liquid cleaning agent composition containing the following component (a), component (b); component (c) and component (e) and water, wherein component (a) is an alkyl sulfosuccinic acid ester or a salt thereof, component (b) is one or more surfactants selected from a semipolar surfactant and an amphoteric surfactant, component (c) is a nonionic surfactant, and component (e) is an enzyme.

12 Claims, No Drawings

METHOD FOR CLEANING OBJECT SURFACE

CROSS-REFERENCE TO RELATED APPLICATIONS

The present application is a national entry of International Patent Application No. PCT/JP2023/016633 filed Apr. 27, 2023, which claims priority to Japanese Patent Application No. 2022-074082 filed Apr. 28, 2022. The contents of these applications are incorporated herein by reference in their entirety.

FIELD OF THE INVENTION

The present invention relates to a method for cleaning an object surface.

BACKGROUND OF THE INVENTION

As a cleaning agent composition containing surfactants, a so-called concentrated-type cleaning agent composition having a higher surfactant concentration than conventional cleaning agent compositions is known. It is considered that cleaning agent compositions of the concentrated type can be reduced in size of their own to enable reduction of container resin amounts, reduction of transportation costs, reduction of waste after use or the like, and are very useful for reducing environmental burdens.

Further, when cleaning hard articles around the kitchen such as tableware, cooking utensils and others, it is necessary to clean stubborn contamination composed of a combination of solid fat and liquid fat.

Moreover, tap water is generally used as water used for cleaning hard articles and clothing or the like. In general, cleaning power is affected by the hardness of water used. Tap water within Japan often has a hardness of 1 to 5°dH (by German hardness). However, in some areas within Japan or areas outside Japan, tap water has a high hardness of 8 to 20° dH, and such water is used for cleaning hard articles and clothing or the like. Accordingly, exhibiting excellent cleaning performance without being affected by the hardness of water used for cleaning is required.

JP-A 2020-152757 discloses a liquid cleaning agent composition for tableware attaining more excellent cleaning power, foamability and dewatering performance, the composition containing component (A): a specific dialkyl sulfosuccinic acid ester or a salt thereof, component (B): at least one selected from a semipolar surfactant and an amphoteric surfactant, component (C); a cationized cellulose, and component (D): anionic surfactants excluding component (A), wherein a mass ratio represented by component (A)/component (B) is 0.05 to 0.5, and a mass ratio represented by component (D)/component (B) is 0.5 to 1.5.

JP-A 2019-182911 discloses a liquid cleaning agent composition for tableware and/or hard articles around the kitchen attaining excellent cleaning power for solid fat-containing contamination adhering to tableware or the like, the cleaning power being excellent after storage, and attaining excellent enzyme stability and composition stability after storage, the composition containing (a) an alkyl sulfosuccinic acid ester having an alkyl group with 5 or more and 18 or less carbons or a salt thereof [hereinafter referred to as component (a)] in an amount of 0.01 mass % or more and 5.0 mass % or less, (b) one or more surfactants selected from a semipolar surfactant and an amphoteric surfactant [hereinafter referred to as component (b)] in an amount of 0.01 mass % or more and 5.0 mass % or less, (c) an enzyme [hereinafter referred to as component (c)] and water, wherein a mass ratio of component (a)/component (b) is 0.01 or more and 100 or less.

JP-A 2021-17508 discloses a method for cleaning a hard article including, bringing an undiluted liquid cleaning agent composition into contact with the hard article to which liquid oil-containing contamination adheres, leaving it as it is without external force being applied, and thereafter rinsing it with water, the liquid cleaning agent composition containing (a) a surfactant [hereinafter referred to as component (a)] in an amount of 0.1 mass % or more and 15 mass % or less, (b) an enzyme [hereinafter referred to as component (b)] in an amount of 1 ppm or more and 1000 ppm or less in terms of enzyme protein, and at least one of (c) an inorganic salt [hereinafter referred to as component (c)] and (d) a carboxylic acid salt [hereinafter referred to as component (d)], wherein a mass ratio of a content of component (a) to a content of components (c) and (d), (a)/[(c)+ (d)], is 0.1 or more and 10 or less.

SUMMARY OF THE INVENTION

JP-A 2019-182911 reports that cleaning power for solid fat-containing contamination adhering to tableware or the like is exhibited due to the effect of the enzyme combined with the formulation where the alkyl sulfosuccinic acid ester and the amphoteric or semipolar surfactant are combined at the low concentrations. On the other hand, it is expected that, in the formulation where the surfactants are combined at high concentrations, the effect of the enzyme is reduced as the surfactants become more likely to act on the enzyme, but the patent literature does not disclose at all the effect of the enzyme in the formulation where the surfactants are combined at high concentrations.

Further, cleaning an object surface of a hard article or the like requires high cleaning power to be exhibited for solid fat-containing contamination adhering to the object surface of tableware or the like without being affected by the hardness of water used for cleaning.

The present invention provides a method for cleaning an object surface, the method having enzyme activity even if using high concentrations of surfactants and an enzyme together, and exhibiting excellent cleaning performance for solid fat-containing contamination adhering to the object surface of tableware or the like without being affected by the hardness of water used for cleaning (for example, 0 to 20° dH (by German hardness)).

The present invention relates to a method for cleaning an object surface including, bringing a cleaning liquid obtained by diluting a liquid cleaning agent composition with water into contact with the object surface, the liquid cleaning agent composition containing the following component (a), component (b), component (c) and component (e) and water,

- component (a): an alkyl sulfosuccinic acid ester or a salt thereof,
- component (b): one or more surfactants selected from a semipolar surfactant and an amphoteric surfactant,
- component (c): a nonionic surfactant, and
- component (e): an enzyme.

Further, the present invention relates to a liquid cleaning agent composition containing the above component (a), component (b), component (c) and component (e) and water.

The present invention provides a method for cleaning an object surface, the method having enzyme activity even if using high concentrations of surfactants and an enzyme together, and exhibiting excellent cleaning performance for solid fat-containing contamination adhering to the object surface of tableware or the like without being affected by the hardness of water used for cleaning (for example, 0 to 20° dH (by German hardness)).

EMBODIMENTS OF THE INVENTION

The reason why the liquid cleaning agent composition and the method for cleaning an object surface of the present invention have enzyme activity even if using high concentrations of surfactants and an enzyme together, and exhibit excellent cleaning performance for solid fat-containing contamination adhering to the object surface of tableware or the like without being affected by the hardness of water used for cleaning (for example, 0 to 20° dH (by German hardness)) is not wholly certain, but is inferred as follows.

Surfactants generally act on enzymes through electrostatic or hydrophobic interactions, and thus, an enzyme loses its activity in a liquid cleaning agent composition containing a high concentration of surfactants. Further, hardness components contained in water used for diluting the liquid cleaning agent composition bring about changes in packing performance between the surfactants, thereby significantly changing cleaning performance of the liquid cleaning agent composition. However, it is considered that, in the liquid cleaning agent composition of the present invention, electrostatic interactions between various types of surfactants contained in the composition are strong, and the interactions between the various types of surfactants cause screening of electric charge, and thus, the action of the various types of surfactants on enzymes is small, and the presence of a nonionic surfactant alleviates the impact of hardness components on packing performance due to the electrostatic interactions between the various types of surfactants, thus attaining the effects of the present invention.

The present invention relates to a method for cleaning an object surface including, bringing a cleaning liquid obtained by diluting a liquid cleaning agent composition with water by a factor of 10 or more and 10000 or less into contact with the object surface, the liquid cleaning agent composition containing the above component (a), component (b), component (c) and component (e) and water (hereinafter referred to as the liquid cleaning agent composition of the present invention). Hereinafter, the liquid cleaning agent composition of the present invention is explained.

[Liquid Cleaning Agent Composition]

<Component (a)>

Component (a) of the present invention is an alkyl sulfosuccinic acid ester or a salt thereof, and preferably an alkyl sulfosuccinic acid ester having an alkyl group with 5 or more and 18 or less carbons or a salt thereof from the viewpoint of cleaning performance.

Examples of the ester of component (a) include a monoester and a diester.

Specific examples of the alkyl group of component (a) include a group selected from a hexyl group, an octyl group, a nonyl group, a decyl group, a dodecyl group, a tridecyl group, a 2-ethylhexyl group, an n-octyl group, a sec-octyl group, an isopentyl group, an isononyl group, an isodecyl group, a cyclohexyl group, a 1-butylhexyl group, a 3,5,5-trimethylhexyl group, a 1-butylpentyl group, a 1-(2-methylpropyl)-3-methylbutyl group, a 2-propylpentyl group and a 2-propylheptyl group, and a group selected from a 2-ethylhexyl group and a 2-propylheptyl group is preferable from the viewpoint of cleaning performance for solid fat-containing contamination (hereinafter simply referred to as cleaning performance).

The liquid cleaning agent composition of the present invention may contain two selected from (a-1) an alkyl sulfosuccinic acid ester having an alkyl group with 5 or more and 8 or less carbons or a salt thereof (hereinafter referred to as component (a-1)) and (a-2) an alkyl sulfosuccinic acid ester having an alkyl group with 9 or more and 18 or less carbons or a salt thereof (hereinafter referred to as component (a-2)) as component (a) from the viewpoint of cleaning performance. The aspects described in component (a) can be appropriately applied to components (a-1) and (a-2).

Component (a) is preferably a branched alkyl sulfosuccinic acid ester having a branched alkyl group with 8 or more and 12 or less carbons or a salt thereof (hereinafter referred to as component (a1)) from the viewpoint of cleaning performance.

The branched alkyl group of component (a1) is preferably a branched alkyl group with 8 or more and 12 or less carbons, more preferably a branched alkyl group with 8 or more and 10 or less carbons and further preferably a branched alkyl group having a main chain with 6 or 7 carbons and one or more side chains, the side chains having 2 or more and 3 or less carbons in total. The branched alkyl group of component (a1) is preferably a branched alkyl group selected from a 2-propylheptyl group and a 2-ethylhexyl group and further preferably a 2-ethylhexyl group.

Examples of component (a1) include a branched sulfosuccinic acid ester represented by the following general formula (a1):

$$R^{1a}-(OA^1)_x-OCOCH_2\underset{\displaystyle SO_3M^1}{CH}COO-(A^2O)_y-R^{2a} \qquad (a1)$$

wherein $R^{1a}$ and $R^{2a}$ each independently represent a branched alkyl group with 8 or more and 12 or less carbons, $A^1$ and $A^2$ each independently represent an alkylene group with 2 or more and 4 or less carbons, x and y each independently represent an average number of added moles which is 0 or more and 6 or less, and $M^1$ represents a hydrogen atom or a cation.

Examples of component (a1) further include a branched alkyl sulfosuccinic acid ester represented by the following general formula (a1-a). This compound is a compound of the general formula (a1) in which x=0 and y=0.

$$R^{1a}-OCOCH_2\underset{\displaystyle SO_3M^1}{CH}COO-R^{2a} \qquad (a1\text{-}a)$$

wherein $R^{1a}$ and $R^{2a}$ each independently represent a branched alkyl group with 8 or more and 12 or less carbons, and $M^1$ represents a hydrogen atom or a cation.

The following explanation can be applied to each of the general formulas (a1) and (a1-a).

$R^{1a}$ and $R^{2a}$ may have the same number or different numbers of carbons.

In the present invention, a hydrocarbon residue derived by the removal of a hydroxyl group from a secondary alcohol is included as an open-chain branched hydrocarbon group.

In the present invention, in each of the open-chain branched hydrocarbon groups of $R^{1a}$ and $R^{2a}$, a hydrocarbon chain whose carbon number counted from the carbon atom bonded to the oxygen atom is the largest is considered to be a main chain, and a hydrocarbon chain branching off from and bonded to the main chain is considered to be a side chain.

When there are two or more possible main chains, in other words, when there are two or more hydrocarbon chains having the largest number of carbons (hereinafter also referred to as the longest hydrocarbon chains), the main chain is determined in the following order:

1. a longest hydrocarbon chain having a larger number of carbon atoms in the side chain branching off therefrom is considered to be the main chain;
2. next, when the side chains branching off from the longest hydrocarbon chains have the same number of carbon atoms, a longest hydrocarbon chain from which a larger number of side chains branch off is considered to be the main chain;
3. next, when the same number of side chains branch off from the longest hydrocarbon chains, a longest hydrocarbon chain having a side chain at a carbon atom which is closer to the oxygen atom when counted from the carbon atom bonded to the oxygen atom is considered to be the main chain; and
4. next, when the carbon atoms having a side chain closest to the oxygen atom are in the same position, a longest hydrocarbon chain having a larger number of carbon atoms in the side chain closest to the oxygen atom is considered to be the main chain.

Note that when there are two or more longest hydrocarbon chains having the same symmetric structure, either of them may be considered to be the main chain.

The side chains of the branched alkyl groups of $R^{1a}$ and $R^{2a}$ may have the same number or different numbers of constituent carbons in total, and each preferably have 2 or more and 3 or less constituent carbons in total from the viewpoints of cleaning performance and formulation stability.

In the present invention, the total number of carbons constituting side chains is the total of the carbon numbers of all side chains other than the main chain in one branched alkyl group, and when there are multiple side chains, it is the total of the carbon numbers of all those side chains.

$R^{1a}$ and $R^{2a}$ may have the same number or different numbers of side chains, and each have 1 or more, and preferably 3 or less and more preferably 2 or less side chains from the viewpoints of cleaning performance and formulation stability.

In the present invention, the number of side chains is the number of side chains branching off from the main chain, and even if a side chain further has a side chain branching off from the side chain, the number of side chains remains the same. However, a side chain may further have a side chain branching off from the side chain from the viewpoints of cleaning performance and formulation stability.

$R^{1a}$ and $R^{2a}$ may have the same number or different numbers of branch carbons, and each have 1 or more, and preferably 3 or less and furthermore preferably 2 or less branch carbons from the viewpoints of cleaning performance and formulation stability.

In the present invention, the number of branch carbons is the total of the numbers of tertiary carbon atoms and quaternary carbon atoms in an open-chain branched hydrocarbon group.

In the preferable aspects of $R^{1a}$ and $R^{2a}$, the open-chain branched hydrocarbon groups of $R^{1a}$ and $R^{2a}$ each independently have 8 or more and 12 or less and further 8 or more and 10 or less carbons in total, each independently have a main chain with 6 or 7 carbons, each independently have a side chain with 1 or more and 3 or less constituent carbons, and each independently have one side chain.

$R^{1a}$ and $R^{2a}$ may represent the same or different specific branched alkyl groups, and each represent preferably a branched alkyl group selected from a 2-propylheptyl group and a 2-ethylhexyl group and more preferably a 2-ethylhexyl group.

In the general formula (a1), $A^1$ and $A^2$ each independently represent an alkylene group with 2 or more, and 4 or less and preferably 3 or less carbons.

In the general formula (a1), x and y each independently represent an average number of added moles, which is 0 or more, and 6 or less, preferably 4 or less, more preferably 2 or less and further preferably 0 from the viewpoints of cleaning performance and formulation stability.

Further, x+y is preferably 0 or more, and preferably 12 or less, more preferably 6 or less, further preferably 3 or less and furthermore preferably 0 from the viewpoints of cleaning performance and formulation stability.

In the general formula (a1), $M^1$ is a hydrogen ion, or an inorganic cation such as a sodium ion, an ammonium ion, a potassium ion, a magnesium ion or the like, an organic cation such as a monoethanolammonium ion, a diethanolammonium ion, a triethanolammonium ion, a morpholinium ion or the like, and preferably an inorganic cation selected from a sodium ion, an ammonium ion, a potassium ion and a magnesium ion.

A method for preparing a compound of the general formula (a1) in which $R^{1a}$ and $R^{2a}$ are the same is not particularly limited, and for example, a method described in U.S. Pat. No. 2,028,091 can be referred to for the production thereof, and as a method for preparing an asymmetric compound in which $R^{1a}$ and $R^{2a}$ are different, for example, JP-A S58-24555 can be referred to for the production thereof. As a raw material of component (a1), a compound obtained by adding an alkylene oxide to an alcohol with a predetermined number of carbons can also be used.

Examples of a suitable alcohol used for producing component (a1) of the present invention include (1) primary alcohols typified by 2-ethylhexan-1-ol, 3,5,5-trimethylhexan-1-ol, 2-propylheptan-1-ol and others; and (2) secondary alcohols typified by 5-nonanol, 2,6-dimethyl-4-heptanol and others.

The liquid cleaning agent composition of the present invention may contain two selected from (a1-1) a branched alkyl sulfosuccinic acid ester having a branched alkyl group with 8 carbons or a salt thereof (hereinafter referred to as component (a1-1)) and (a1-2) a branched alkyl sulfosuccinic acid ester having a branched alkyl group with 9 or more and 12 or less carbons or a salt thereof (hereinafter referred to as component (a1-2)) as component (a1) from the viewpoint of cleaning performance. The aspects described in component (a1) can be appropriately applied to components (a1-1) and (a1-2).

<Component (b)>

Component (b) of the present invention is one or more surfactants selected from a semipolar surfactant and an amphoteric surfactant.

Component (b) is preferably an amphoteric surfactant from the viewpoint of cleaning performance.

Examples of the semipolar surfactant include an amine oxide-type surfactant. Examples of the amphoteric surfactant include a betaine-type surfactant.

Component (b) of the present invention is preferably one or more selected from an amine oxide-type surfactant and a betaine-type surfactant and more preferably a betaine-type surfactant from the viewpoint of cleaning performance.

Component (b) of the present invention may be one or more surfactants selected from a semipolar surfactant and an amphoteric surfactant and preferably an amphoteric surfactant from the viewpoint of cleaning performance.

Component (b) of the present invention may be preferably one or more selected from an amine oxide-type surfactant and a betaine-type surfactant and more preferably a betaine-type surfactant from the viewpoint of cleaning performance.

The amine oxide-type surfactant is suitably a compound of the following general formula (b1):

(b1)

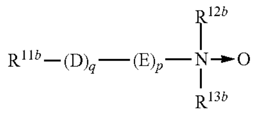

wherein $R^{11b}$ represents a hydrocarbon group, preferably an alkyl group or an alkenyl group and more preferably an alkyl group with 7 or more and 22 or less carbons, $R^{12b}$ and $R^{13b}$ are the same or different and each represent an alkyl group with 1 or more and 3 or less carbons, D represents —NHC(═O)— group or —C(═O)NH— group, E represents an alkylene group with 1 or more and 5 or less carbons, and q and p represent q=0 and p=0 or q=1 and p=1.

In the general formula (b1), when q=1 and p=1, $R^{11b}$ is a hydrocarbon group and preferably an alkyl group with 9 or more and preferably 11 or more, and 18 or less, preferably 16 or less and more preferably 14 or less carbons from the viewpoints of cleaning performance and formulation stability.

Further, when q=0 and p=0, $R^{11b}$ is a hydrocarbon group and preferably an alkyl group with 10 or more and preferably 12 or more, and 18 or less, preferably 16 or less and more preferably 14 or less carbons from the viewpoints of cleaning performance and formulation stability. In the present invention, q=0 and p=0 is preferable. $R^{12b}$ and $R^{13b}$ each represent preferably a methyl group with one carbon.

Examples of the betaine-type surfactant include a compound of the following general formula (b2) and a sulfobetaine, and the compound of the following general formula (b2) is preferable from the viewpoint of cleaning performance.

(b2)

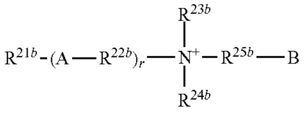

wherein $R^{21b}$ is an alkyl group or an alkenyl group with 7 or more and 18 or less carbons, $R^{22b}$ is an alkylene group with 1 or more and 6 or less carbons, A is a group selected from —COO—, —CONH—, —OCO—, —NHCO— and —O—, r is a number of 0 or 1, $R^{23b}$ and $R^{24b}$ each represent an alkyl group or a hydroxyalkyl group with 1 or more and 3 or less carbons, $R^{25b}$ is an alkylene group with 1 or more and 5 or less carbons which may be substituted by a hydroxy group, and B is $—COO^-$.

In the general formula (b2), $R^{21b}$ is an alkyl group or an alkenyl group and preferably an alkyl group with 7 or more and preferably 10 or more, and 18 or less, preferably 14 or less and more preferably 12 or less carbons from the viewpoints of cleaning performance and formulation stability.

A is preferably —COO— or —CONH— and more preferably —CONH— from the viewpoints of cleaning performance and formulation stability.

$R^{22b}$ has preferably 2 or 3 carbons.

$R^{23b}$ and $R^{24b}$ each represent preferably a methyl group.

r is preferably 1.

$R^{25b}$ has preferably one carbon.

Examples of the sulfobetaine include an N-alkyl-N, N-dimethyl-N-sulfopropyl ammonium sulfobetaine having an alkyl group with preferably 10 or more and preferably 18 or less and more preferably 14 or less carbons, an N-alkyl-N, N-dimethyl-N-(2-hydroxysulfopropyl) ammonium sulfobetaine having an alkyl group with preferably 10 or more and preferably 18 or less and more preferably 14 or less carbons, an N-alkanoyl aminopropyl-N, N-dimethyl-N-sulfopropyl ammonium sulfobetaine having an alkanoyl group with preferably 10 or more and preferably 18 or less and more preferably 14 or less carbons and an N-alkanoyl aminopropyl-N, N-dimethyl-N-(2-hydroxysulfopropyl) ammonium sulfobetaine having an alkanoyl group with preferably 10 or more and preferably 18 or less and more preferably 14 or less carbons.

Specific examples of the betaine-type surfactant include one or more selected from alkyl carboxybetaines, alkyl amide carboxybetaines, alkyl amino fatty acid salts and the above sulfobetaines, and one or more selected from alkyl carboxybetaines, alkyl amide carboxybetaines and alkyl amino fatty acid salts are preferable and one or more selected from an alkylamidopropyl-N, N-dimethyl carboxybetaine and an alkyl-N, N-dimethyl acetic acid betaine are more preferable from the viewpoints of cleaning performance and formulation stability. The alkyl groups of these have 7 or more and preferably 10 or more, and 18 or less, preferably 14 or less and more preferably 12 or less carbons.

<Component (c)>

Component (c) of the present invention is a nonionic surfactant.

Examples of the nonionic surfactant of component (c) can include an alkyl monoglyceryl ether, a polyoxyalkylene monoalkyl or alkenyl ether, an alkyl (poly)glycoside (a glycoside-type nonionic surfactant), a sorbitan-based nonionic surfactant, an aliphatic alkanol amide, a fatty acid monoglyceride, a sucrose fatty acid ester and an amidated product of an alkanol amine such as monoethanolamine, diethanolamine, methyl monoethanolamine or the like with a fatty acid such as lauric acid, myristic acid or the like. One or more of these nonionic surfactants can be used. The nonionic surfactant has an alkyl group or an alkenyl group with, for example, 6 or more and 18 or less carbons. An average number of added moles of an oxyalkylene group of the nonionic surfactant, for example, an oxyethylene group is, for example, 3 or more and 25 or less.

Component (c) is preferably one or more selected from (c1) an alkyl (poly)glycoside (hereinafter referred as component (c1)) and (c2) a polyoxyalkylene monoalkyl ether (hereinafter referred to as component (c2)) and more preferably (c1) an alkyl (poly)glycoside from the viewpoint of cleaning performance.

The alkyl group of component (c1) is preferably a primary alkyl group and more preferably a linear primary alkyl group from the viewpoint of cleaning performance. The alkyl group has preferably 8 or more and more preferably 10 or more, and preferably 18 or less, more preferably 16 or less and further preferably 14 or less carbons from the viewpoint of cleaning performance. Component (c1) has preferably a linear primary alkyl group with 8 or more and 14 or less carbons and more preferably a linear primary alkyl group with 10 or 12 carbons from the viewpoint of cleaning performance. An average degree of polymerization of the glycoside of component (c1) is preferably 1.0 or more and more preferably 1.3 or more, and preferably 3.0 or less, more preferably 2.5 or less, further preferably 2.0 or less and furthermore preferably 1.7 or less from the viewpoint of cleaning performance.

The alkyl group of component (c2) is preferably a primary alkyl group, more preferably a linear or branched primary alkyl group and further preferably a linear primary alkyl group from the viewpoint of cleaning performance. The alkyl group has preferably 8 or more and more preferably 12 or more, and preferably 18 or less, more preferably 14 or less and further preferably 12 carbons from the viewpoint of cleaning performance. The oxyalkylene group of component (c2) is preferably one or more selected from an oxyethylene group and an oxypropylene group and more preferably an oxyethylene group from the viewpoint of cleaning performance. An average number of added moles of the oxyalkylene group of component (c2) is preferably 3 or more, more preferably 6 or more and further preferably 8 or more, and preferably 25 or less, more preferably 18 or less and further preferably 10 or less from the viewpoint of cleaning performance.

<Component (d)>

The liquid cleaning agent composition of the present invention can optionally contain the following component (d):

component (d): a surfactant other than components (a), (b) and (c).

Examples of component (d) include one or more selected from (d1) an anionic surfactant (hereinafter referred to as component (d1)) and (d2) a cationic surfactant (hereinafter referred to as component (d2)).

Examples of the anionic surfactant of component (d1) include one or more selected from an alkylbenzene sulfonate, an alkyl or alkenyl ether sulfate, an alkyl or alkenyl sulfate, an alkane sulfonate, a saturated or unsaturated fatty acid salt, an alkyl or alkenyl ether carboxylate, an x-sulfo fatty acid salt, an N-acyl amino acid and a phosphate mono or diester. Examples of the alkyl ether sulfate include a polyoxyethylene alkyl ether sulfate.

The anionic surfactant has an alkyl group or an alkenyl group with, for example, 8 or more and 22 or less carbons. An average number of added moles of an oxyethylene group of the anionic surfactant is, for example, 0 or more and 10 or less. Examples of counterions of anionic groups of these anionic surfactants include alkali metal ions such as a sodium ion, a potassium ion and others, alkaline earth metal ions such as a calcium ion, a magnesium ion and others, an ammonium ion, and alkanol amines having 1 to 3 alkanol groups with 2 or 3 carbons (for example, monoethanolamine, diethanolamine, triethanolamine, triisopropanolamine and others).

One or a combination of two or more of these surfactants can be used.

Examples of the cationic surfactant of component (d2) include an alkyl trimethyl ammonium salt having an alkyl group with 8 or more and 22 or less carbons, a dialkyl dimethyl ammonium salt having an alkyl group with 8 or more and 22 or less carbons, an alkyl dimethyl benzyl ammonium salt having an alkyl group with 8 or more and 22 or less carbons, a benzethonium salt and others. Examples of the salts include halogen salts and alkyl sulfates with 1 or more and 3 or less carbons.

One or a combination of two or more of these surfactants can be used.

<Component (e)>

Component (e) of the present invention is an enzyme.

Component (e) is preferably one or more enzymes selected from lipases, amylases and proteases and more preferably a lipase from the viewpoint of cleaning performance for contamination composed of a combination of oils and fats, sugar, and protein or the like.

The lipases are preferably triacylglycerol lipase on E.C.3.1.1.3, cholesterol esterase on E.C.3.1.1.13, monoacylglycerol lipase on E.C.3.1.1.23 and lipoprotein lipase on E.C.3.1.1.34. The origins of the lipases are not limited, and examples include lipases of animal origin, vegetable origin or microorganism origin. Examples of the lipases of microorganism origin include those derived from the genus *Rhizopus*, the genus *Aspergillus*, the genus *Mucor*, the genus *Pseudomonas*, the genus *Geotrichum*, the genus *Penicillium*, the genus *Candida* and others.

As the lipases, Lipase A "AMANO" 6, Lipase AY "AMANO" 30SD, Lipase GS "AMANO" 250G, Lipase R "AMANO," Lipase DF "AMANO" 15 and Lipase MER "AMANO" (which are all manufactured by Amano Enzyme Inc.), O lipase (NAGASE & CO., LTD.), Lipase MY, Lipase OF, Lipase PL, Lipase PLC, Lipase QLM, Lipase QLC and Phospholipase D (which are all manufactured by Meito Sangyo Co., Ltd.), Lipoprotein lipase (manufactured by Oriental Yeast Co., ltd.), Lipase (manufactured by Toyo Jozo Co. Ltd.), Lipex, Lipolase and Lipase SP-225 (which are all manufactured by Novozymes A/S), Lipase (manufactured by Gist-Brocades International B.V.), and Lipase A and Lipase B (which are both manufactured by Sapporo Breweries Ltd.) can be used.

In the present invention, Lipex or Lipolase is suitable.

Examples of the proteases include proteases that can act in neutral or alkaline aqueous solutions. Specific examples of preferable proteases include an alkaline protease described in WO-A 99/018218, wherein the amino acid sequence shown in sequence No. 1 or 2 is preferably conserved in an amount of 70% or more, an alkaline protease described in JP-A H5-25492, preferably alkaline protease K-16 or alkaline protease K-14, and others. Other examples include the proteases produced by subtilisins of the genus *Bacillus* sold under the trade names Savinase, Kannase, Everlase, Alcalase, Polarzyme, and Esperase (which are all manufactured by Novozymes A/S), the proteases or variants thereof supplied under the trade names FN2, FN3 and FN4, and Purafect and Purafect Prime (which are all manufactured by DuPont), and others. Among these, one or more selected from the enzyme described in WO-A 99/018218, wherein the amino acid sequence shown in sequence No. 1 or 2 is conserved in an amount of 80% or more, Savinase, Everlase, Alcalase, Progress, Purafect and Purafect Prime are more preferable.

As the amylases, those obtained from many organisms, for example, bacteria such as *Bacillus subtilis* Marburg, *Bacillus subtilis* natto, *Bacillus amyloliquefaciens, Bacillus licheniformis, Bacillus cereus, Bacillus macerans, Pseudomonas stutzeri, Klebsiella aerogenes* and others, actinomycetes such as *Streptomyces griseus* and others, molds such as *Aspergillus oryzae, Aspergillus niger* and others, seeds of gramineous and leguminous plants, digestive glands of animals such as humans and pigs or the like, and others can be used. A host cell transformed with a recombinant vector having a DNA sequence that encodes any of the above microorganisms or variants thereof or enzymes thereof or variants thereof, or the like is inoculated to a medium containing assimilable carbon source and nitrogen source and essential nutrients other than these and cultivated in accordance with a usual method, and an amylase obtained therefrom in conformance with general enzyme collection and purification methods can be used in the present invention. An enzyme solution thus obtained can be used as-is, but can be used after further purified, crystallized, formulated into powder or formulated into liquid by a publicly-known method. A preferable amylase used in the present invention is a-amylase. Examples of commercially available amylases that can be used can include Rapidase (manufactured by Gist-Brocades International B.V.), Termamyl, Duramyl, Stainzyme and Amplify (manufactured by Novozymes A/S), and Plaster ST® and Plaster OxAm® (manufactured by Genencor International, Inc.)

<Composition and Others>

The liquid cleaning agent composition of the present invention contains component (a) in an amount of preferably 1 mass % or more, more preferably 2 mass % or more and further preferably 5 mass % or more, and preferably 60 mass % or less, more preferably 40 mass % or less, further preferably 20 mass % or less, furthermore preferably 15 mass % or less and furthermore preferably 12 mass % or less in the liquid cleaning agent composition from the viewpoints of cleaning performance and formulation stability.

The mass of component (a) in the liquid cleaning agent composition of the present invention is specified using a value expressed in terms of a sodium salt.

When the liquid cleaning agent composition of the present invention contains components (a-1) and (a-2) as component (a), a mass ratio of a content of component (a-1) to a content of component (a-2), (a-1)/(a-2), is preferably 1 or more and more preferably 2 or more, and preferably 10 or less, more preferably 8 or less, further preferably 6 or less and furthermore preferably 4 or less from the viewpoint of cleaning power.

When the liquid cleaning agent composition of the present invention contains components (a1-1) and (a1-2) as component (a), a mass ratio of a content of component (a1-1) to a content of component (a1-2), (a1-1)/(a1-2), is preferably 1 or more and more preferably 2 or more, and preferably 10 or less, more preferably 8 or less, further preferably 6 or less and furthermore preferably 4 or less from the viewpoint of cleaning power.

The liquid cleaning agent composition of the present invention contains component (b) in an amount of preferably 0.1 mass % or more, more preferably 5 mass % or more, further preferably 8 mass % or more and furthermore preferably 10 mass % or more, and preferably 60 mass % or less, more preferably 40 mass % or less, further preferably 30 mass % or less, furthermore preferably 25 mass % or less and furthermore preferably 20 mass % or less in the liquid cleaning agent composition from the viewpoints of cleaning performance and enzyme activity.

A mass ratio of a content of component (b) to a content of component (a) in the liquid cleaning agent composition of the present invention, (b)/(a), is preferably 0.01 or more, more preferably 0.4 or more, further preferably 0.8 or more, furthermore preferably 1.0 or more and furthermore preferably 1.2 or more, and preferably 50 or less, more preferably 10 or less, further preferably 3.0 or less and furthermore preferably 1.8 or less from the viewpoints of cleaning performance and enzyme activity.

The liquid cleaning agent composition of the present invention contains component (c) in an amount of preferably 1 mass % or more, more preferably 5 mass % or more and further preferably more than 5 mass %, and preferably 30 mass % or less, more preferably 20 mass % or less, further preferably 15 mass % or less and furthermore preferably 12 mass % or less in the liquid cleaning agent composition from the viewpoints of cleaning performance and enzyme activity.

The liquid cleaning agent composition of the present invention contains component (c) in an amount of preferably more than 5 mass %, and preferably 30 mass or less, more preferably 20 mass % or less, further preferably 15 mass % or less and furthermore preferably 12 mass& or less in the liquid cleaning agent composition from the viewpoints of cleaning performance and enzyme activity. The above content of component (c) is further suitable for the liquid cleaning agent composition of the present invention containing an amine oxide-type surfactant as component (b).

A mass ratio of a content of component (c) to a content of anionic surfactants, i.e., a total content of components (a) and (d1), in the liquid cleaning agent composition of the present invention, (c)/[(a)+ (d1)], is preferably 0.4 or more and more preferably 0.6 or more, and preferably 50 or less, more preferably 10 or less, further preferably 3.0 or less and furthermore preferably 1.8 or less from the viewpoints of cleaning performance and enzyme activity. The above mass ratio (c)/[(a)+ (d1)] is further suitable for the liquid cleaning agent composition of the present invention containing an amine oxide-type surfactant as component (b).

A mass ratio of a content of component (c) to a content of component (a) in the liquid cleaning agent composition of the present invention, (c)/(a), is preferably 0.2 or more, more preferably 0.4 or more and further preferably 0.6 or more, and preferably 3 or less, more preferably 2 or less, further preferably 1.7 or less and furthermore preferably 1.4 or less from the viewpoints of formulation stability and cleaning performance unsusceptible to the hardness of water.

When the liquid cleaning agent composition of the present invention contains component (d), the liquid cleaning agent composition contains component (d) in an amount of 0 mass % or more, preferably 5 mass& or more, more preferably 10 mass % or more, further preferably 20 mass % or more and furthermore preferably 25 mass % or more, and preferably 50 mass % or less, more preferably 40 mass % or less and further preferably 35 mass % or less from the viewpoints of cleaning performance and formulation stability. The liquid cleaning agent composition of the present invention may be free of component (d).

When the liquid cleaning agent composition of the present invention contains component (d1) as component (d), the mass of component (d1) is specified using a value expressed in terms of a sodium salt.

When the liquid cleaning agent composition of the present invention contains component (d2) as component (d), the mass of component (d2) is specified using a value expressed in terms of a chlorine salt.

A mass ratio of a content of component (d) to a content of component (a) in the liquid cleaning agent composition of the present invention, (d)/(a), is preferably 0 or more and more preferably 0.5 or more, and preferably 3 or less, more preferably 2 or less, further preferably 1.5 or less and furthermore preferably 1 or less from the viewpoints of formulation stability and cleaning performance unsusceptible to the hardness of water.

A content of surfactants in the liquid cleaning agent composition of the present invention is preferably 17 mass % or more, more preferably 20 mass % or more, further preferably 22 mass % or more and furthermore preferably 25 mass % or more, and preferably 70 mass % or less, more preferably 60 mass % or less, further preferably 54 mass % or less, furthermore preferably 45 mass % or less and furthermore preferably 35 mass % or less from the viewpoint of cleaning performance.

A total content of components (a), (b), (c) and (d) in the liquid cleaning agent composition of the present invention is preferably 17 mass or more, more preferably 20 mass % or more, further preferably 22 mass % or more and furthermore preferably 25 mass % or more, and preferably 70 mass % or less, more preferably 60 mass % or less, further preferably 54 mass % or less, furthermore preferably 45 mass % or less and furthermore preferably 35 mass % or less from the viewpoint of cleaning performance. Note that the total content of components (a), (b), (c) and (d) is the content of surfactants contained in the liquid cleaning agent composition of the present invention.

The liquid cleaning agent composition of the present invention contains component (e) in an amount of preferably 0.01 mass % or more, more preferably 0.05 mass or more and further preferably 0.1 mass % or more, and preferably 0.5 mass % or less, more preferably 0.4 mass % or less, further preferably 0.3 mass % or less and furthermore preferably 0.2 mass % or less in the liquid cleaning agent composition in terms of enzyme protein from the viewpoints of cleaning performance and costs.

The mass of component (e) in the liquid cleaning agent composition of the present invention is specified by a calculated amount of enzyme protein.

Note that, as a method for quantifying the enzyme protein of component (e), the method described in the Examples can be employed.

A mass ratio of a content of component (e) to a content of component (a) in the liquid cleaning agent composition of the present invention, (e)/(a), is preferably 0.0002 or more, more preferably 0.001 or more, further preferably 0.01 or more and furthermore preferably 0.015 or more, and preferably 0.2 or less, more preferably 0.1 or less, further preferably 0.06 or less, furthermore preferably 0.05 or less and furthermore preferably 0.04 or less from the viewpoints of enzyme activity and cleaning performance.

The liquid cleaning agent composition of the present invention can further contain a water-soluble organic solvent as component (f) from the viewpoints of uniformity and formulation stability.

Examples of component (f) can include (f-1) a monohydric alcohol with 1 or more and 4 or less carbons, (f-2) a polyhydric alcohol with 2 or more and 4 or less carbons, (f-3) a di or trialkylene glycol having an alkylene glycol unit with 2 to 4 carbons and (f-4) a monoalkyl (methyl, ethyl, propyl or butyl), monophenyl or monobenzyl ether of a mono, di, tri or tetraalkylene glycol having an alkylene glycol unit with 2 to 4 carbons. One or more of these can be used.

Component (f) is preferably a water-soluble organic solvent with 2 or more and preferably 3 or more, and 10 or less and preferably 8 or less carbons. Here, the water-soluble organic solvent refers to a solvent with an octanol/water partition coefficient (Log Pow) of 3.5 or less.

Specifically, examples of (f-1) include ethanol, isopropyl alcohol, t-butanol and 2-aminoethanol, examples of (f-2) include 1,3-propanediol, ethylene glycol, propylene glycol, glycerin and isoprene glycol, examples of (f-3) include diethylene glycol and dipropylene glycol, and examples of (f-4) include propylene glycol monomethyl ether, propylene glycol monoethyl ether, diethylene glycol monobutyl ether (also referred to as butyldiglycol or the like), dipropylene glycol butyl ether, phenoxy ethanol, phenoxy triethylene glycol and phenoxy isopropanol. One or more of these can be used.

In the liquid cleaning agent composition of the present invention, component (f) is preferably one or more water-soluble organic solvents selected from ethanol, propylene glycol, dipropylene glycol, diethylene glycol monobutyl ether, phenoxy ethanol and phenoxy isopropanol and more preferably one or more water-soluble organic solvents selected from ethanol, propylene glycol and phenoxy ethanol from the viewpoint of formulation uniformity of the composition.

When the liquid cleaning agent composition of the present invention contains component (f), the liquid cleaning agent composition contains component (f) in an amount of preferably 1 mass % or more, more preferably 5 mass % or more and further preferably 10 mass& or more, and preferably 30 mass % or less, more preferably 20 mass % or less and further preferably 15 mass % or less from the viewpoints of formulation uniformity of the composition and costs.

The liquid cleaning agent composition of the present invention can further contain an inorganic salt as component (g) from the viewpoint of cleaning performance.

As the inorganic salt of component (g), one or more selected from inorganic alkali metal salts, inorganic alkaline earth metal salts and salts of the elements of Groups 8 to 12 of Period 4 can be used.

One or more selected from chlorides, sulfates, carbonates and sulfites are suitable as component (g).

Salts of one or more selected from lithium, sodium and potassium of alkali metals, magnesium and calcium of alkaline earth metals, and iron, copper and zinc of the elements of Groups 8 to 12 of Period 4 can be used as component (g).

Component (g) is more preferably one or more selected from sodium chloride, calcium chloride, magnesium chloride and potassium chloride.

When the liquid cleaning agent composition of the present invention contains component (g), the liquid cleaning agent composition contains component (g) in an amount of preferably 0.001 mass % or more, more preferably 0.004 mass % or more and further preferably 0.008 mass % or more, and preferably 0.2 mass % or less, more preferably 0.15 mass % or less and further preferably 0.1 mass % or less from the viewpoints of cleaning performance and formulation uniformity of the composition.

The liquid cleaning agent composition of the present invention can contain components such as hydrotropic agents, anti-gelling agents such as polyalkylene glycols and others, thickeners such as polyacrylic acid and others, fragrances, dyes, pigments, bactericides, antiseptics, pH adjusters and others.

The liquid cleaning agent composition of the present invention contains water. In other words, the balance other than the above components (a) to (e) and other optional components is water. The liquid cleaning agent composition of the present invention contains water in an amount of preferably 20 mass % or more, more preferably 30 mass % or more and further preferably 40 mass % or more, and preferably 60 mass % or less and more preferably 50 mass % or less in the liquid cleaning agent composition. Ion-exchanged water, sterile ion-exchanged water or the like is preferably used as the water.

A pH of the liquid cleaning agent composition of the present invention at 25° C. is preferably 6.0 or more, more preferably 6.5 or more and further preferably 7.0 or more, and preferably 10 or less, more preferably 8.0 or less and further preferably 7.5 or less from the viewpoint of enzyme stability.

A viscosity of the liquid cleaning agent composition of the present invention at 20° C. is preferably 2000 mPa's or less and more preferably 1000 mPa·s or less. A lower limit of this viscosity can be preferably 10 mPa·s or more, more preferably 30 mPa·s or more and further preferably 50 mPa·s or more.

The liquid cleaning agent composition of the present invention can be directed to uses for (1) food, for example, the surface of food materials such as vegetables and others, or the like, (2) hard articles, and (3) textile products, for example, fiber materials such as cloth, thread and others and products produced using these, or the like.

The liquid cleaning agent composition of the present invention can be suitably used for hard articles.

Examples of the hard articles include hard articles having hard surfaces such as, for example, bathrooms, toilets, kitchens, floors, door knobs, tableware, hard articles around the kitchen, food processing equipment, desks, chairs, walls and others. These hard articles may be those used in households or those used in public facilities or plants, for example, pools, bathhouses, restaurants, hospitals and others.

The liquid cleaning agent composition of the present invention can be suitably used for, particularly, tableware and/or hard articles around the kitchen.

The hard articles around the kitchen are articles used around the kitchen, specifically, (1) storage areas for food, tableware and cooking utensils, such as refrigerators, cupboards and others,
(2) food preparation areas such as drains, cooktops, range hoods, sinks, gas ranges, microwave ovens and others, and
(3) floors or walls around the storage areas or the preparation areas, or the like. In the present invention, these are referred to as “hard articles around the kitchen” for convenience.

Further, specific examples of the tableware include components or utensils coming in contact with foodstuffs, such as (i) so-called tableware such as plates, bowls and others,
(ii) storage containers such as Tupperware, jars and others,
(iii) cooking utensils such as knives, cutting boards, pots, pans, fish grills and others, and
(iv) cooking appliances such as food processors, mixers and others, or the like. In the present invention, these are referred to as “tableware” for convenience.

Examples of materials of the tableware and/or hard articles around the kitchen to which the present invention is directed include plastic (including silicone resin and others), metal, ceramic, wood and a combination of those.

The liquid cleaning agent composition of the present invention is diluted with water when used. A hardness of the water used for the liquid cleaning agent composition of the present invention is preferably 0° DH or more, more preferably 4° DH or more, further preferably 8° DH or more and furthermore preferably 10° DH or more, and preferably 20° DH or less, more preferably 16° DH or less and further preferably 11° DH or less by German hardness from the viewpoint of cleaning performance.

Here, German hardness ('dH) herein refers to a concentration of calcium and magnesium in water expressed in terms of a $CaCO_3$ concentration, and 1 mg/L (ppm)=approximately 0.056° dH (1°dH=17.8 ppm). This concentration of calcium and magnesium for German hardness is determined by a chelate titration method using ethylenediaminetetraacetate disodium salt.

A specific method for measuring the German hardness of water herein is described below.

<Method for Measuring German Hardness of Water>

[Reagent]

0.01 mol/l EDTA·2Na solution: 0.01 mol/l aqueous solution of disodium ethylenediaminetetraacetate (solution for titration, 0.01 M EDTA-2Na, manufactured by Sigma-Aldrich)

Indicator Universal BT (product name: Universal BT manufactured by DOJINDO LABORATORIES)

Ammonia buffer solution for hardness measurements (solution obtained by dissolving 67.5 g of ammonium chloride in 570 ml of 28 w/v % ammonia solution and making the total 1000 ml with ion-exchanged water)

[Measurement of Hardness]

(1) 20 ml of water as a sample is collected in a conical beaker with a volumetric pipette.
(2) 2 ml of the ammonia buffer solution for hardness measurements is added.
(3) 0.5 ml of the indicator Universal BT is added. It is confirmed that the solution after the addition is reddish purple.
(4) While the conical beaker is shaken well, the 0.01 mol/l EDTA·2Na solution is added dropwise from a burette, and the point of time when the water as a sample turns blue is taken as the end point of titration.
(5) The total hardness is determined by the following calculation formula:

$$\text{hardness } (°\text{ dH}) = T \times 0.01 \times F \times 56.0774 \times 100 / A$$

T: titration amount of 0.01 mol/l EDTA·2Na solution (mL)

A: sample volume (20 mL, the volume of water as a sample)

F: factor for 0.01 mol/l EDTA·2Na solution

[Method for Cleaning Object Surface]

The present invention provides a method for cleaning an object surface including, bringing a cleaning liquid into contact with the object surface, the cleaning liquid being obtained by diluting the liquid cleaning agent composition of the present invention with water by a factor of 10 or more and 10000 or less (hereinafter referred to as the cleaning liquid of the present invention).

The aspects described in the liquid cleaning agent composition of the present invention can be appropriately applied to the method for cleaning an object surface of the present invention.

A hardness of the water used for diluting the liquid cleaning agent composition of the present invention falls within the same range as described in the liquid cleaning agent composition of the present invention, and a method for measuring the hardness of water is also the same.

Object surfaces to which the cleaning method of the present invention is directed can be object surfaces such as (1) food, for example, the surface of food materials such as vegetables and others, or the like, (2) hard articles, and (3) textile products, for example, fiber materials such as cloth, thread and others and products produced using these, or the like.

The object surfaces to which the cleaning method of the present invention is directed are preferably hard surfaces of hard articles and more preferably hard surfaces of tableware and/or hard articles around the kitchen.

The hard articles and the tableware and/or hard articles around the kitchen are the same as in the aspects described in the liquid cleaning agent composition of the present invention.

In the cleaning method of the present invention, the liquid cleaning agent composition of the present invention is diluted with water by a factor of 10 or more, preferably 30 or more, more preferably 50 or more and further preferably 100 or more from the viewpoint of cleaning performance, and 10000 or less, preferably 5000 or less, more preferably 1000 or less and further preferably 200 or less from the viewpoints of cleaning performance and reduction of environmental burdens relating to discharge of cleaning water to the environment.

When the content of surfactants or the total content of components (a), (b), (c) and (d) in the liquid cleaning agent composition of the present invention is 10 mass % or more and 50 mass % or less, the liquid cleaning agent composition of the present invention is diluted with water by a factor of 10 or more, preferably 15 or more, more preferably 20 or more, further preferably 25 or more and furthermore preferably 50 or more, and 5000 or less, preferably 2500 or less, more preferably 2000 or less and further preferably 1500 or less from the viewpoints of cleaning performance and formulation stability. Further, when the content of surfactants or the total content of components (a), (b), (c) and (d) in the liquid cleaning agent composition of the present invention is more than 50 mass % and 70 mass % or less, the liquid cleaning agent composition of the present invention is diluted with water by a factor of 50 or more, preferably 55 or more, more preferably 60 or more and further preferably 70 or more, and 10000 or less, preferably 8000 or less, more preferably 5500 or less and further preferably 5000 or less.

A content of surfactants in the cleaning liquid of the present invention is preferably 0.01 mass % or more, more preferably 0.05 mass % or more, further preferably 0.1 mass % or more and furthermore preferably 0.2 mass % or more, and preferably 1.0 mass % or less, more preferably 0.8 mass % or less and further preferably 0.6 mass % or less from the viewpoint of cleaning performance.

A total content of components (a), (b), (c) and (d) in the cleaning liquid of the present invention is preferably 0.01 mass % or more, more preferably 0.05 mass& or more, further preferably 0.1 mass % or more and furthermore preferably 0.2 mass % or more, and preferably 1.0 mass % or less, more preferably 0.8 mass % or less and further preferably 0.6 mass % or less from the viewpoint of cleaning performance.

A mass ratio (a-1)/(a-2) of a content of component (a-1) to a content of component (a-2), a mass ratio (a1-1)/(a1-2) of a content of component (a1-1) to a content of component (a1-2), a mass ratio (b)/(a) of a content of component (b) to a content of component (a), a mass ratio (c-1)/(a) of a content of component (c-1) to a content of component (a), a mass ratio (c-2)/(a) of a content of component (c-2) to a content of component (a), a mass ratio (d)/(a) of a content of component (d) to a content of component (a) and a mass ratio (e)/(a) of a content of component (e) to a content of component (a) in the cleaning liquid of the present invention fall within the same ranges as described in the liquid cleaning agent composition of the present invention.

In the cleaning method of the present invention, the cleaning liquid obtained by diluting the liquid cleaning agent composition of the present invention with water is brought into contact with the object surface in foam form or liquid form.

Examples of a method for bringing the cleaning liquid of the present invention into contact with the object surface include applying, spraying and immersing, and immersing is preferable.

As a method for applying the cleaning liquid of the present invention to the object surface, the cleaning liquid of the present invention may be applied directly to the object surface, or the cleaning liquid of the present invention may be applied to the object surface in liquid form by making the cleaning liquid adhere to a flexible material to be retained therein or in foam form by further rubbing the flexible material by hand several times.

Examples of a method for spraying the cleaning liquid of the present invention on the object surface include a method of filling the cleaning liquid into a container provided with a sprayer and spraying it in liquid droplet form or foam form.

Examples of the container provided with a sprayer include a manual spray device using no propellant such as a trigger-type spray container, a pump-type spray container or the like, an aerosol using a propellant, and others.

The container provided with a sprayer is preferably a trigger-type spray capable of spraying the contents in liquid droplet form or foam form, and more preferably a trigger-type spray provided with a mechanism for spraying the contents in liquid droplet form or a trigger-type spray provided with a mechanism for forming foam (foam forming mechanism).

After the cleaning liquid of the present invention is applied to or sprayed on the object surface, the object surface may be left as it is or may be washed by rubbing with external force (physical force) applied thereto using a flexible material such as a sponge or the like or fingers and others.

The time that the object surface is left as it is after the cleaning liquid of the present invention is applied thereto or sprayed thereon (contact time) is preferably 60 seconds or more, more preferably 3 minutes or more and further preferably 5 minutes or more, and preferably 60 minutes or less, more preferably 30 minutes or less and further preferably 10 minutes or less from the viewpoint of cleaning performance.

When the object surface is immersed in the cleaning liquid of the present invention, the immersion time is preferably 60 seconds or more, more preferably 3 minutes or more and further preferably 5 minutes or more, and preferably 60 minutes or less, more preferably 30 minutes or less and further preferably 10 minutes or less from the viewpoint of cleaning performance.

The object surface is rinsed with water after brought into contact with the cleaning liquid of the present invention (or after left as it is or immersed therein if left as it is or immersed therein). During rinsing, the object surface may be rinsed with external force (physical force) applied thereto using a flexible material such as a sponge or the like or fingers and others or may be simply rinsed with water flow.

In addition to the aforementioned embodiments, the present invention discloses the aspects below.

<1>

A method for cleaning an object surface including, bringing a cleaning liquid obtained by diluting a liquid cleaning agent composition with water into contact with the object surface, the liquid cleaning agent composition containing the following component (a), component (b), component (c) and component (e) and water,

- component (a): an alkyl sulfosuccinic acid ester or a salt thereof,
- component (b): one or more surfactants selected from a semipolar surfactant and an amphoteric surfactant, component (c): a nonionic surfactant, and component (e): an enzyme.

<2>

The method for cleaning an object surface according to <1>, wherein component (a) contains two selected from (a-1) an alkyl sulfosuccinic acid ester having an alkyl group with 5 or more and 8 or less carbons or a salt thereof (hereinafter referred to as component (a-1)) and (a-2) an alkyl sulfosuccinic acid ester having an alkyl group with 9 or more and 18 or less carbons or a salt thereof (hereinafter referred to as component (a-2)).

<3>

The method for cleaning an object surface according to <1>, wherein component (a) is a branched alkyl sulfosuccinic acid ester having a branched alkyl group with 8 or more and 12 or less carbons or a salt thereof (hereinafter referred as component (a1)).

<4>

The method for cleaning an object surface according to <3>, wherein the branched alkyl group of component (a1) is preferably a branched alkyl group with 8 or more and 12 or less carbons, more preferably a branched alkyl group with 8 or more and 10 or less carbons, and a branched alkyl group having a main chain with 6 or 7 carbons and one or more side chains, the side chains having 2 or more and 3 or less carbons in total.

<5>

The method for cleaning an object surface according to <3>, wherein the branched alkyl group of component (a1) is a branched alkyl group selected from a 2-propylheptyl group and a 2-ethylhexyl group and preferably a 2-ethylhexyl group.

<6>

The method for cleaning an object surface according to any of <1> to <5>, wherein a content of component (a) in the liquid cleaning agent composition is preferably 1 mass % or more, more preferably 2 mass % or more and further preferably 5 mass % or more, and preferably 60 mass % or less, more preferably 40 mass % or less, further preferably 20 mass % or less, furthermore preferably 15 mass % or less and furthermore preferably 12 mass % or less.

<7>

The method for cleaning an object surface according to any of <1> to <6>, wherein a content of component (a) in the liquid cleaning agent composition is 5 mass % or more and 12 mass % or less.

<8>

The method for cleaning an object surface according to any of <1> to <7>, wherein component (b) is one or more surfactants selected from a semipolar surfactant and an amphoteric surfactant and preferably one or more surfactants selected from an amine oxide-type surfactant and a betaine-type surfactant.

<9>

The method for cleaning an object surface according to <8>, wherein the amine oxide-type surfactant is a compound of the following general formula (b1):

(b1)

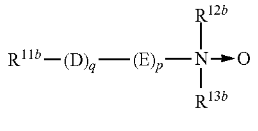

wherein $R^{11b}$ represents a hydrocarbon group, preferably an alkyl group or an alkenyl group and more preferably an alkyl group with 7 or more and 22 or less carbons, $R^{12b}$ and $R^{13b}$ are the same or different and each represent an alkyl group with 1 or more and 3 or less carbons, D represents —NHC(═O)— group or —C(═O)NH— group, E represents an alkylene group with 1 or more and 5 or less carbons, and q and p represent q=0 and p=0 or q=1 and p=1.

<10>

The method for cleaning an object surface according to <8> or <9>, wherein the betaine-type surfactant is one or more selected from an alkyl carboxybetaine, an alkyl amide carboxybetaine, an alkyl amino fatty acid salt and a sulfobetaine, preferably one or more selected from an alkyl carboxybetaine, an alkyl amide carboxybetaine and an alkyl amino fatty acid salt, and more preferably one or more selected from an alkylamidopropyl-N, N-dimethyl carboxybetaine and an alkyl-N, N-dimethyl acetic acid betaine, the alkyl groups having 7 or more and preferably 10 or more, and 18 or less, preferably 14 or less and more preferably 12 or less carbons.

<11>

The method for cleaning an object surface according to <8> or <9>, wherein the betaine-type surfactant is one or more selected from an alkylamidopropyl-N, N-dimethyl carboxybetaine having an alkyl group with 10 or more and 12 or less carbons and an alkyl-N, N-dimethyl acetic acid betaine having an alkyl group with 10 or more and 12 or less carbons.

<12>

The method for cleaning an object surface according to any of <1> to <11>, wherein a content of component (b) in the liquid cleaning agent composition is preferably 0.1 mass % or more, more preferably 5 mass % or more, further preferably 8 mass % or more and furthermore preferably 10 mass % or more, and preferably 60 mass % or less, more preferably 40 mass % or less, further preferably 30 mass % or less, furthermore preferably 25 mass % or less and furthermore preferably 20 mass % or less.

<13>

The method for cleaning an object surface according to any of <1> to <11>, wherein a content of component (b) in the liquid cleaning agent composition is 10 mass % or more and 20 mass % or less.

<14>

The method for cleaning an object surface according to any of <1> to <13>, wherein a mass ratio of a content of component (b) to a content of component (a) in the liquid cleaning agent composition, (b)/(a), is preferably 0.01 or more, more preferably 0.4 or more, further preferably 0.8 or more, furthermore preferably 1.0 or more and furthermore preferably 1.2 or more, and preferably 50 or less, more preferably 10 or less, further preferably 3.0 or less and furthermore preferably 1.8 or less.

<15>

The method for cleaning an object surface according to any of <1> to <13>, wherein a mass ratio of a content of component (b) to a content of component (a) in the liquid cleaning agent composition, (b)/(a), is 1.2 or more and 1.8 or less.

<16>

The method for cleaning an object surface according to any of <1> to <15>, wherein component (c) is one or more selected from an alkyl monoglyceryl ether, a polyoxyalkylene monoalkyl or alkenyl ether, an alkyl (poly)glycoside (a glycoside-type nonionic surfactant), a sorbitan-based nonionic surfactant, an aliphatic alkanol amide, a fatty acid monoglyceride, a sucrose fatty acid ester and an amidated product of an alkanol amine with a fatty acid.

<17>

The method for cleaning an object surface according to any of <1> to <15>, wherein component (c) is one or more selected from (c1) an alkyl (poly)glycoside (hereinafter referred as component (c1)) and (c2) a polyoxyalkylene monoalkyl ether (hereinafter referred to as component (c2)) and more preferably (c1) an alkyl (poly)glycoside.

<18>

The method for cleaning an object surface according to any of <1> to <17>, wherein a content of component (c) in the liquid cleaning agent composition is preferably 1 mass % or more, more preferably 5 mass % or more and further preferably more than 5 mass %, and preferably 30 mass % or less, more preferably 20 mass % or less, further preferably 15 mass % or less and furthermore preferably 12 mass % or less.

<19>

The method for cleaning an object surface according to any of <1> to <18>, wherein component (e) is one or more enzymes selected from lipases, amylases and proteases and preferably a lipase.

<20>

The method for cleaning an object surface according to any of <1> to <19>, wherein a content of component (e) in the liquid cleaning agent composition is preferably 0.01 mass % or more, more preferably 0.05 mass % or more and further preferably 0.1 mass % or more, and preferably 0.5 mass % or less, more preferably 0.4 mass % or less, further preferably 0.3 mass % or less and furthermore preferably 0.2 mass % or less in terms of enzyme protein.

<21>

The method for cleaning an object surface according to any of <1> to <20>, wherein a content of component (e) in the liquid cleaning agent composition is 0.1 mass % or more and 0.2 mass % or less in terms of enzyme protein.

<22>

The method for cleaning an object surface according to any of <1> to <21>, wherein a mass ratio of a content of component (e) to a content of component (a) in the liquid cleaning agent composition, (e)/(a), is preferably 0.0002 or more, more preferably 0.001 or more, further preferably 0.01 or more and furthermore preferably 0.015 or more, and preferably 0.2 or less, more preferably 0.1 or less, further preferably 0.06 or less, furthermore preferably 0.05 or less and furthermore preferably 0.04 or less.

<23>

The method for cleaning an object surface according to any of <1> to <21>, wherein a mass ratio of a content of component (e) to a content of component (a) in the liquid cleaning agent composition, (e)/(a), is 0.015 or more and 0.04 or less.

<24>

The method for cleaning an object surface according to any of <1> to <23>, wherein the liquid cleaning agent composition optionally further contains the following component (d), component (d): a surfactant other than components (a), (b) and (c).

<25>

The method for cleaning an object surface according to <24>, wherein component (d) is one or more selected from (d1) an anionic surfactant (hereinafter referred to as component (d1)) and (d2) a cationic surfactant (hereinafter referred to as component (d2)).

<26>

The method for cleaning an object surface according to <24> or <25>, wherein a content of component (d) in the liquid cleaning agent composition is 0 mass % or more, preferably 5 mass % or more, more preferably 10 mass % or more, further preferably 20 mass % or more and furthermore preferably 25 mass % or more, and preferably 50 mass % or less, more preferably 40 mass % or less and further preferably 35 mass % or less.

<27>

The method for cleaning an object surface according to <24> or <25>, wherein a content of component (d) in the liquid cleaning agent composition is 25 mass % or more and 35 mass % or less.

<28>

The method for cleaning an object surface according to any of <24> to <27>, wherein a mass ratio of a content of component (d) to a content of component (a) in the liquid cleaning agent composition, (d)/(a), is preferably 0 or more and more preferably 0.5 or more, and preferably 3 or less, more preferably 2 or less, further preferably 1.5 or less and furthermore preferably 1 or less.

<29>

The method for cleaning an object surface according to any of <24> to <27>, wherein a mass ratio of a content of component (d) to a content of component (a) in the liquid cleaning agent composition, (d)/(a), is 0.5 or more and 1 or less.

<30>

The method for cleaning an object surface according to any of <24> to <29>, wherein a total content of components (a), (b), (c) and (d) in the liquid cleaning agent composition is preferably 17 mass % or more, more preferably 20 mass& or more, further preferably 22 mass % or more and furthermore preferably 25 mass % or more, and preferably 70 mass % or less, more preferably 60 mass % or less, further preferably 54 mass % or less, furthermore preferably 45 mass % or less and furthermore preferably 35 mass % or less.

<31>

The method for cleaning an object surface according to any of <24> to <29>, wherein a total content of components (a), (b), (c) and (d) in the liquid cleaning agent composition is 25 mass % or more and 54 mass % or less.

<32>

The method for cleaning an object surface according to any of <1> to <31>, wherein the liquid cleaning agent composition further contains a water-soluble organic solvent as component (f).

<33>

The method for cleaning an object surface according to <32>, wherein component (f) is one or more water-soluble organic solvents selected from ethanol, propylene glycol, dipropylene glycol, diethylene glycol monobutyl ether, phenoxy ethanol and phenoxy isopropanol, and preferably one or more water-soluble organic solvents selected from ethanol, propylene glycol and phenoxy ethanol.

<34>

The method for cleaning an object surface according to <32> or <33>, wherein a content of component (f) in the liquid cleaning agent composition is preferably 1 mass % or more, more preferably 5 mass or more and further preferably 10 mass % or more, and preferably 30 mass % or less, more preferably 20 mass % or less and further preferably 15 mass& or less.

<35>

The method for cleaning an object surface according to <32> or <33>, wherein a content of component (f) in the liquid cleaning agent composition is 10 mass % or more and 15 mass % or less.

<36>

The method for cleaning an object surface according to any of <1> to <35>, wherein the liquid cleaning agent composition further contains an inorganic salt as component (g).

<37>

The method for cleaning an object surface according to <36>, wherein component (g) is one or more selected from sodium chloride, calcium chloride, magnesium chloride and potassium chloride.

<38>

The method for cleaning an object surface according to <36> or <37>, wherein a content of component (g) in the liquid cleaning agent composition is preferably 0.001 mass % or more, more preferably 0.004 mass % or more and further preferably 0.008 mass % or more, and preferably 0.2 mass& or less, more preferably 0.15 mass % or less and further preferably 0.1 mass % or less.

<39>

The method for cleaning an object surface according to <36> or <37>, wherein a content of component (g) in the liquid cleaning agent composition is 0.008 mass % or more and 0.1 mass % or less.

<40>

The method for cleaning an object surface according to any of <1> to <39>, wherein a content of water in the liquid cleaning agent composition is preferably 20 mass % or more, more preferably 30 mass % or more and further preferably 40 mass % or more, and preferably 60 mass % or less and more preferably 50 mass % or less.

<41>

The method for cleaning an object surface according to any of <1> to <40>, wherein a content of water in the liquid cleaning agent composition is 40 mass % or more and 50 mass % or less.

<42>

The method for cleaning an object surface according to any of <1> to <41>, wherein the object surface is a hard surface of a hard article.

<43>

The method for cleaning an object surface according to <42>, wherein the hard article is tableware and/or a hard article around the kitchen.

<44>

The method for cleaning an object surface according to any of <1> to <43>, wherein a hardness of the water used for diluting the liquid cleaning agent composition is preferably 0° DH or more, more preferably 4° DH or more, further preferably 8° DH or more and furthermore preferably 10° DH or more, and preferably 20° DH or less, more preferably 16° DH or less and further preferably 11° DH or less by German hardness.

<45>

The method for cleaning an object surface according to any of <1> to <43>, wherein a hardness of the water used for diluting the liquid cleaning agent composition is 10° DH or more and 11° DH or less by German hardness.

<46>

The method for cleaning an object surface according to any of <1> to <45>, wherein a method for bringing the cleaning liquid into contact with the object surface is applying, spraying or immersing and preferably immersing.

<47>

A liquid cleaning agent composition containing the following component (a), component (b), component (c) and component (e) and water, component (a): an alkyl sulfosuccinic acid ester or a salt thereof, component (b): one or more surfactants selected from a semipolar surfactant and an amphoteric surfactant, component (c): a nonionic surfactant, and component (e): an enzyme.

EXAMPLES (1) Preparation of Liquid Cleaning Agent Composition

The liquid cleaning agent compositions shown in Tables 1 to 3 were prepared using the formulation components below, and evaluations were conducted on the items described later. The liquid cleaning agent compositions in Tables 1 to 3 were prepared by a usual method. In other words, components (a) to (f) were added to an adequate amount of water and dissolved therein at room temperature (25° C.), and then, sodium hydroxide and/or hydrochloric acid were added thereto to adjust a pH (25° C.) to 7.0. Note that the mass percentages of the formulation components in Table 1 to 3 are all numerical values based on effective amounts. The contents (mass %) of component (e) indicate those of enzyme protein. Note that the enzyme protein of component (e) was quantified in accordance with a standard assay method using Protein Assay Kit II (catalog No. 500-0002) manufactured by Bio-Rad Laboratories, Inc. and using bovine serum albumin attached to the kit as a standard protein.

<Formulation Component>

<Component (a)>

D26SS: sodium di(2-ethylhexyl)sulfosuccinate, a compound of the general formula (a1-a) in which $R^{1a}$ and $R^{2a}$ are 2-ethylhexyl groups and $M^1$ is a sodium ion <Component (b)>:

Betaine (1): lauramidopropyl carboxybetaine, a compound of the general formula (b2) in which $R^{21b}$ is an alkyl group with 11 carbons, $R^{22b}$ is a propylene group, A is-CONH—, r is 1, $R^{23b}$ and $R^{24b}$ are methyl groups, $R^{25b}$ is a methylene group, and B is —$COO^-$, AMPHITOL 20AB, manufactured by Kao Corporation Betaine (2): lauryl dimethyl amino acetate betaine, a compound of the general formula (b2) in which $R^{21b}$ is an alkyl group with 12 carbons, r is 0, $R^{23b}$ and $R^{24b}$ are methyl groups, $R^{25b}$ is a methylene group, and B is —$COO^-$, AMPHITOL 20BS, manufactured by Kao Corporation.

Amine oxide: lauryl dimethyl amine oxide, a compound of the general formula (b1) in which $R^{11b}$ is an alkyl group with 12 carbons, $R^{12b}$ and $R^{13b}$ are methyl groups, and q=0 and p=0, AMPHITOL 20N, manufactured by Kao Corporation <Component (c)>

AG: alkyl polyglucoside, carbon number of alkyl group: 8 to 14, average degree of condensation of sugar: 1.6 to 1.7.

AE: polyoxyethylene (9) lauryl ether (the average number of added moles of the oxyethylene group is shown in parenthesis)

<Component (e)>

Lipase: Lipex Evity 100L, manufactured by Novozymes A/S (effective amount 5%)·

Amylase: Amplify Prime 100L, manufactured by Novozymes A/S (effective amount 5%)

<Component (f)>

EtOH: ethanol (99.5%), manufactured by FUJIFILM Wako Pure Chemical Corporation (2) Evaluation 1 of Cleaning Power The mass of a polypropylene test piece with 30 mm (width)×80 mm (length)×1 mm (thickness) was measured with a four-digit balance (x). An oil and fat component at beef tallow/rape-seed oil=9/1 (mass ratio) was dissolved in chloroform to obtain solid fat-containing model contamination. The solid fat-containing model contamination was uniformly applied to the polypropylene test piece so that the apply amount was 0.02 g, and chloroform was evaporated and dried to obtain a contaminated piece. The mass of the contaminated piece was measured with the four-digit balance (y).

Calcium chloride (manufactured by FUJIFILM Wako Pure Chemical Corporation) and magnesium chloride hexahydrate (manufactured by FUJIFILM Wako Pure Chemical Corporation) were added to ion-exchanged water so that Ca/Mg=8/2 (molar ratio) to prepare 4° DH hardness water, 11° DH hardness water and 16° DH hardness water.

In a beaker, a dilution was prepared by diluting each liquid cleaning agent composition in Table 1 with each hardness water by a factor of 100, and the contaminated piece was immersed such that the portion to which the model contamination was applied was all brought into contact with the dilution. The temperature of the dilution was 25° C.

After 5 minutes of immersion, the contaminated piece was taken out, and rinsed with running distilled water for 15 seconds. After the rinsing was ended and then the contaminated piece was dried, the mass thereof was measured with the four-digit balance (z). A cleaning rate of the solid fat-containing model contamination was determined by the formula below.

A larger cleaning rate value is preferable. The results are shown in Table 1.

$$\text{Cleaning rate (\%)} = \{(y)-(z)\}/\{(y)-(x)\}\times 100$$

TABLE 1

| | | | | Example | | | | | | |
|---|---|---|---|---|---|---|---|---|---|---|
| | | | | 1 | 2 | 3 | 4 | 5 | 6 | 7 |
| Liquid cleaning agent composition | Formulation composition (mass %) | (a) | D26SS | 8.4 | 8.4 | 8.4 | 8.4 | 8.4 | 8.4 | 5.6 |
| | | (b) | Betaine (1) | 14.0 | | | 8.4 | | | 14.0 |
| | | | Betaine (2) | | 14.0 | | | 8.4 | | |
| | | | Amine oxide | | | 14.0 | | | 8.4 | |
| | | (c) | AG | 5.6 | 5.6 | 5.6 | 11.2 | 11.2 | 11.2 | |
| | | | AE | | | | | | | 8.4 |
| | | (e) | Lipase | 0.175 | 0.175 | 0.175 | 0.175 | 0.175 | 0.175 | 0.175 |
| | | (f) | EtOH | 10.0 | 10.0 | 10.0 | 10.0 | 10.0 | 10.0 | 10.0 |
| | | Water | | Balance | Balance | Balance | Balance | Balance | Balance | Balance |
| | | Total | | 100 | 100 | 100 | 100 | 100 | 100 | 100 |
| | (a) + (b) + (c) (mass %) | | | 28.0 | 28.0 | 28.0 | 28.0 | 28.0 | 28.0 | 28.0 |
| | (b)/(a) (mass ratio) | | | 1.7 | 1.7 | 1.7 | 1.0 | 1.0 | 1.0 | 2.5 |
| | (c)/(a) (mass ratio) | | | 0.7 | 0.7 | 0.7 | 1.3 | 1.3 | 1.3 | 1.5 |
| | (e)/(a) (mass ratio) | | | 0.021 | 0.021 | 0.021 | 0.021 | 0.021 | 0.021 | 0.031 |
| Evaluation | Cleaning rate of solid fat-containing model contamination (%) | | 4° DH | 70.7 | 69.0 | 85.7 | 71.4 | 63.1 | 67.7 | 53.4 |
| | | | 11° DH | 57.7 | 65.5 | 46.4 | 65.5 | 65.0 | 44.9 | 60.4 |
| | | | 16° DH | 64.3 | 67.3 | 38.1 | 61.3 | 62.9 | 37.4 | 58.8 |

The liquid cleaning agent compositions shown in Table 1 can attain the effects of the present invention even if component (b) therein is replaced by the sulfobetaines described above.

(3) Evaluation 1 of Enzyme Activity

Cleaning rate A of the solid fat-containing model contamination by cleaning agent composition A shown in Table 2 containing an enzyme and cleaning rate B of the solid fat-containing model contamination by cleaning agent composition B shown in Table 2 which was cleaning agent composition A from which only the enzyme was excluded were determined by the method described in the above (2). In Table 2, {(cleaning rate A)−(cleaning rate B)} is shown as an enzymatic cleaning rate (%), and enzyme activity was calculated by the formula below. A larger enzyme activity value is preferable.

$$\text{Enzyme activity (\%)} = \{(\text{cleaning rate } A)-(\text{cleaning rate } B)\}/(\text{cleaning rate } A)\times 100$$

TABLE 2

| | | | Example 5 | Comparative example 1 |
|---|---|---|---|---|
| Liquid cleaning agent composition | Type of cleaning agent composition | | A | B |
| | Formulation composition (mass %) | (a) D26SS | 8.4 | 8.4 |
| | | (b) Betaine (2) | 8.4 | 8.4 |
| | | (c) AG | 11.2 | 11.2 |
| | | (e) Lipase | 0.175 | |
| | | (f) EtOH | 10.0 | 10.0 |
| | | Water | Balance | Balance |
| | | Total | 100 | 100 |
| | (a) + (b) + (c) (mass %) | | 28.0 | 28.0 |
| | (b)/(a) (mass ratio) | | 1.0 | 1.0 |
| | (c)/(a) (mass ratio) | | 1.3 | 1.3 |
| | (e)/(a) (mass ratio) | | 0.021 | 0 |
| Evaluation | 4°DH | Enzymatic cleaning rate (%) | 9.6 | |
| | | Enzyme activity (%) | 15.1 | |
| | 11°DH | Enzymatic cleaning rate (%) | 15.1 | |
| | | Enzyme activity (%) | 23.3 | |
| | 16°DH | Enzymatic cleaning rate (%) | 8.8 | |
| | | Enzyme activity (%) | 14.0 | |

(4) Evaluation 2 of Cleaning Power

The mass of a glass test piece with 26 mm (width)×76 mm (length)×1 mm (thickness) was measured with the four-digit balance (x'). Meat sauce (KEWPIE Aeru Pasta Sauce, manufactured by Kewpie Corporation) stirred with a mixer until it became uniform was used as combined model contamination containing solid fat, sugar or the like. The combined model contamination was uniformly applied to the glass test piece so that the apply amount was 0.07 g, and water was evaporated and dried to obtain a contaminated piece. The mass of the contaminated piece was measured with the four-digit balance (y').

Calcium chloride (manufactured by FUJIFILM Wako Pure Chemical Corporation) and magnesium chloride hexahydrate (manufactured by FUJIFILM Wako Pure Chemical Corporation) were added to ion-exchanged water so that Ca/Mg=8/2 (molar ratio) to prepare 4°DH hardness water, 11°DH hardness water and 16° DH hardness water.

In a beaker, a dilution was prepared by diluting each liquid cleaning agent composition in Table 3 with each hardness water by a factor of 100, and the contaminated piece was immersed such that the portion to which the model contamination was applied was all brought into contact with the dilution. The temperature of the dilution was 25° C.

After 1 minute of immersion, the contaminated piece was taken out, and rinsed with running distilled water for 15 seconds. After the rinsing was ended and then the contaminated piece was dried, the mass thereof was measured with the four-digit balance (z'). A cleaning rate of the combined model contamination was determined by the formula below. A larger cleaning rate value is preferable. The results are shown in Table 3.

$$\text{Cleaning rate (\%)} = \{(y') - (z')\}/\{(y') - (x')\} \times 100$$

(5) Evaluation 2 of Enzyme Activity

Cleaning rate A of the solid fat-containing combined model contamination by cleaning agent composition A shown in Table 3 (examples 8 to 10) containing any enzyme and cleaning rate B of the solid fat-containing combined model contamination by cleaning agent composition B shown in Table 3 (comparative example 2) which was cleaning agent composition A containing components (a) to (f) from which only the enzyme was excluded were determined by the method described in the above (4). In Table 3, {(cleaning rate A)–(cleaning rate B)} is shown as an enzymatic cleaning rate (%), and enzyme activity was calculated by the formula below, A larger enzyme activity value is preferable.

$$\text{Enzyme activity (\%)} = \{(\text{cleaning rate } A) - (\text{cleaning rate } B)\}/(\text{cleaning rate } A) \times 100$$

TABLE 3

| | | | Example 8 | Example 9 | Example 10 | Comparative example 2 |
|---|---|---|---|---|---|---|
| Liquid cleaning agent composition | Type of cleaning agent composition | | A | A | A | B |
| | Formulation composition (mass %) | (a) D26SS | 8.4 | 8.4 | 8.4 | 8.4 |
| | | (b) Betaine (1) | | 8.4 | 8.4 | 8.4 |
| | | Betaine (2) | 8.4 | | | |
| | | (c) AG | 11.2 | 11.2 | 11.2 | 11.2 |
| | | (e) Lipase | 0.175 | 0.088 | | |
| | | Amylase | | 0.088 | 0.175 | |
| | | (f) EtOH | 10.0 | 10.0 | 10.0 | 10.0 |

TABLE 3-continued

| | | | Example | | | Comparative example |
|---|---|---|---|---|---|---|
| | | | 8 | 9 | 10 | 2 |
| | Water | | Balance | Balance | Balance | Balance |
| | Total | | 100 | 100 | 100 | 100 |
| | (a) + (b) + (c) (mass %) | | 28.0 | 28.0 | 28.0 | 28.0 |
| | (b)/(a) (mass ratio) | | 1.0 | 1.0 | 1.0 | 1.0 |
| | (c)/(a) (mass ratio) | | 1.3 | 1.3 | 1.3 | 1.3 |
| | (e)/(a) (mass ratio) | | 0.021 | 0.021 | 0.021 | 0 |
| Evaluation | Cleaning rate of solid fat-containing combined model contamination (%) | 4° DH | 84.4 | 95.3 | 77.5 | 76.2 |
| | | 11° DH | 87.3 | 95.4 | 77.9 | 73.8 |
| | | 16° DH | 89.9 | 97.7 | 84.2 | 69.7 |
| Evaluation | 4°DH | Enzymatic cleaning rate (%) | 8.2 | 19.1 | 1.4 | — |
| | | Enzyme activity (%) | 9.7 | 20.1 | 1.8 | — |
| | 11°DH | Enzymatic cleaning rate (%) | 13.5 | 21.6 | 4.1 | — |
| | | Enzyme activity (%) | 15.4 | 22.6 | 5.3 | — |
| | 16°DH | Enzymatic cleaning rate (%) | 20.2 | 28.0 | 14.5 | — |
| | | Enzyme activity (%) | 22.5 | 28.7 | 17.2 | — |

The invention claimed is:

1. A method for cleaning an object surface comprising:

bringing a cleaning liquid obtained by diluting a liquid cleaning agent composition with water into contact with the object surface, the liquid cleaning agent composition comprising: component (a); component (b); component (c); component (e); and water, wherein the component (a) is a branched alkyl sulfosuccinic acid ester having a branched alkyl group with 8 or more and 12 or less carbon atoms, or a salt thereof, the component (b) is a betaine-type surfactant, the component (c) is a nonionic surfactant, and the component (e) is an enzyme, and wherein a mass ratio of a content of the component (b) to a content of the component (a) in the liquid cleaning agent composition, (b)/(a), is 0.8 or more and 1.8 or less.

2. The method for cleaning an object surface according to claim 1, wherein the component (c) is one or more selected from a polyoxyalkylene monoalkyl ether and an alkyl (poly) glycoside.

3. The method for cleaning an object surface according to claim 1, wherein the betaine-type surfactant is one or more selected from an alkylamidopropyl-N,N-dimethyl carboxybetaine and an alkyl-N,N-dimethyl acetic acid betaine.

4. The method for cleaning an object surface according to claim 1, wherein the component (e) is one or more selected from lipases, amylases and proteases.

5. The method for cleaning an object surface according to claim 1, wherein the liquid cleaning agent composition further comprises component (f) which is a water-soluble organic solvent.

6. The method for cleaning an object surface according to claim 1, wherein the liquid cleaning agent composition further comprises component (g) which is an inorganic salt.

7. The method for cleaning an object surface according to claim 1, wherein a hardness of the water used for diluting the liquid cleaning agent composition is 4° DH or more.

8. The method for cleaning an object surface according to claim 1, wherein a method for bringing the cleaning liquid into contact with the object surface is applying, spraying or immersing.

9. The method for cleaning an object surface according to claim 1, wherein a mass ratio of a content of the component (c) to a content of the component (a) in the liquid cleaning agent composition, (c)/(a), is 0.2 or more and 3 or less.

10. The method for cleaning an object surface according to claim 1, wherein the object surface is a hard surface of a hard article.

11. The method for cleaning an object surface according to claim 10, wherein the hard article is tableware and/or a hard article around the kitchen.

12. A liquid cleaning agent composition comprising: component (a); component (b); component (c); component (e); and water, wherein component (a) is a branched alkyl sulfosuccinic acid ester having a branched alkyl group with 8 or more and 12 or less carbon atoms, or a salt thereof, component (b) is a betaine-type surfactant, component (c) is a nonionic surfactant, and component (e) is an enzyme, and wherein a mass ratio of a content of the component (b) to a content of the component (a) in the liquid cleaning agent composition, (b)/(a), is 0.8 or more and 1.8 or less.

* * * * *